US012679775B2

(12) United States Patent
Banhos et al.

(10) Patent No.: US 12,679,775 B2
(45) Date of Patent: Jul. 14, 2026

(54) SACRIFICIAL FIBERS FOR COOLING AIR FLOW IN CERAMIC MATRIX COMPOSITES, METHODS OF MANUFACTURE AND ARTICLES COMPRISING THE SAME

(71) Applicant: RTX Corporation, Farmington, CT (US)

(72) Inventors: Jonas S. Banhos, Rocky Hill, CT (US); James T. Roach, Vernon, CT (US); Russell Kim, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 13 days.

(21) Appl. No.: 17/543,029

(22) Filed: Dec. 6, 2021

(65) Prior Publication Data

US 2023/0174432 A1      Jun. 8, 2023

(51) Int. Cl.
*C04B 35/628* (2006.01)
*C04B 35/573* (2006.01)
*C04B 35/83* (2006.01)

(52) U.S. Cl.
CPC ...... *C04B 35/62894* (2013.01); *C04B 35/573* (2013.01); *C04B 35/62863* (2013.01); *C04B 35/83* (2013.01); *C04B 2235/5244* (2013.01); *C04B 2235/5264* (2013.01); *C04B 2237/365* (2013.01); *C04B 2237/38* (2013.01)

(58) Field of Classification Search
CPC ............ C04B 35/62894; C04B 35/573; C04B 35/62863; C04B 35/83; C04B 2235/5244; C04B 2235/5264; C04B 2237/365; C04B 2237/38
See application file for complete search history.

(56) References Cited

U.S. PATENT DOCUMENTS

| | | | |
|---|---|---|---|
| 10,995,039 B1 | 5/2021 | Dunn et al. | |
| 2015/0328848 A1* | 11/2015 | Patrick | .................... B32B 5/024 |
| | | | 264/45.1 |
| 2016/0348511 A1* | 12/2016 | Varney | .................. C04B 38/065 |
| 2018/0362413 A1* | 12/2018 | Hall | ..................... C04B 35/5622 |
| 2020/0308066 A1* | 10/2020 | Shiang | .................. C04B 41/457 |
| 2021/0189902 A1 | 6/2021 | Dyson et al. | |

FOREIGN PATENT DOCUMENTS

WO        2020209848 A1      10/2020

OTHER PUBLICATIONS

Rao, P. Nageswara, and Deepak Kunzru. "Fabrication of microchannels on stainless steel by wet chemical etching." Journal of micromechanics and microengineering 17.12 (2007): N99. (Year: 2007).*

Extended European Search Report for EP Application No. 22211631. 1; Report mail date May 12, 2023, 7 pages.

* cited by examiner

*Primary Examiner* — Cameron K Miller
(74) *Attorney, Agent, or Firm* — CANTOR COLBURN LLP

(57) ABSTRACT

Disclosed herein is a composite comprising a ceramic matrix composite comprising a ceramic matrix and ceramic fibers; and one or more sacrificial fibers woven into the ceramic matrix composite; where the sacrificial fibers are operative to undergo oxidation or melting upon being subjected to an elevated temperature; and wherein the sacrificial fibers leave cooling holes in the composite preform upon being subjected to oxidation or melting.

9 Claims, 4 Drawing Sheets

100

Warp          102          Weft (or Fill)

103

Lateral Direction

Longitudinal Direction

SACRIFICIAL FIBERS FOR COOLING AIR FLOW IN CERAMIC MATRIX COMPOSITES, METHODS OF MANUFACTURE AND ARTICLES COMPRISING THE SAME

BACKGROUND

This disclosure relates to sacrificial fibers for use in ceramic matrix composites, methods of manufacture thereof and articles comprising the same. In particular, this disclosure relates to the use of sacrificial fibers to form cooling holes in a ceramic matrix composite.

Preforms are used for the fabrication of ceramic matrix composite (CMC) structures using chemical vapor infiltration (CVI), polymer infiltration pyrolysis (PIP) and melt infiltration (MI). A preform generally comprises a plurality of plies which are made from a fabric. The fabric comprises fibers, which can be unidirectional or woven (e.g., plain weave, 5 Harness Satin Weave, 8 Harness Satin Weave, twill). These fibers are often manufactured from ceramics Chemical vapor infiltration (CVI) is a ceramic engineering process whereby matrix material is infiltrated into fibrous preforms by the use of reactive gases at elevated temperature to form fiber-reinforced composites. CVI can be applied to the production of carbon-carbon composites and ceramic-matrix composites. Chemical vapor infiltration (CVI) can potentially be used at temperatures of up to and greater than 2700° F. Polymer infiltration pyrolysis (PIP) comprises the infiltration of a low viscosity polymer into the fiber structure, followed by pyrolysis. Under pyrolysis, the polymer precursor is heated in an inert atmosphere and transformed into a ceramic due to its decomposition. Melt infiltration is based on the infiltration of porous matrices with the melt of an active phase or precursor. These ceramic matrix composites are used in a variety of high temperature applications such as turbine blades, vanes, and so on.

When used in such a gas turbine, the ceramic matrix composite can be subjected to high temperatures and extreme thermal gradients. The high temperatures and stress caused by the extreme thermal gradient can lead to a breakdown in the ceramic matrix composite component. In order to reduce the stress and prevent overheating, cooling voids are often used in the ceramic matrix composite components.

Such cooling voids often involve holes that are machined (via techniques such as drilling, milling, and the like) into the surface of the ceramic matrix composite to allow air to circulate through. This air circulation reduces the stress and provides better temperature control. The machining involves the application of a high amount of stress on the fibers of the preform, often resulting in cracks in the preform around the resulting cooling hole. These cracks can propagate, in some form linking up with cracks in other nearby holes to create larger cracks in the ceramic matrix composite. Cracks can result in damage to the composite and in some cases these cracks can be catastrophic. These cracks can cause poor performance, ultimately reducing the service life of the component.

SUMMARY

Disclosed herein is a composite comprising a ceramic matrix composite comprising a ceramic matrix and ceramic fibers; and one or more sacrificial fibers woven into the ceramic matrix composite; where the sacrificial fibers are operative to undergo oxidation or melting upon being subjected to an elevated temperature; and wherein the sacrificial fibers leave cooling holes in the composite preform upon being subjected to oxidation or melting.

In an embodiment, the ceramic fibers comprise SiC, $Al_2O_3$, BN, $B_4C$, $Si_3N_4$, $MoSi_2$, $SiO_2$, SiOC, SiNC, and/or SiONC.

In another embodiment, the sacrificial fibers comprise metal fibers, carbon fibers, glass fibers, or a combination thereof.

In another embodiment, the metal fibers and glass fibers melt at temperatures of greater than 800° C.

In yet another embodiment, the carbon fibers undergo oxidation in an oxidizing atmosphere.

In yet another embodiment, the sacrificial fiber is present in the ceramic matrix composite in an amount of greater than or equal to 20 wt %, based on a total weight of the ceramic matrix composite.

In yet another embodiment, the sacrificial fiber is woven into the ceramic matrix composite in a periodic fashion.

In yet another embodiment, the sacrificial fiber is woven into the ceramic matrix composite in an aperiodic fashion.

In yet another embodiment, the sacrificial fiber has a diameter of 30 to 1600 micrometers.

In yet another embodiment, the metal fiber comprises stainless steel, titanium, tantalum, tungsten, nickel, or a combination thereof.

In yet another embodiment, the glass fiber comprises E-glass, A-glass, C-glass, D-glass, R-glass, S-glass or a derivative of one of the foregoing glasses.

Disclosed herein is a method comprising disposing in a ceramic matrix composite a sacrificial yarn; where the ceramic matrix composite comprises a ceramic matrix and ceramic fibers; subjecting the ceramic matrix composite to an elevated temperature effective to remove the sacrificial yarn; and forming a cooling hole in the ceramic matrix composite at the location where the sacrificial yarn existed prior to its removal.

In yet another embodiment, the sacrificial fibers comprise metal fibers, carbon fibers, glass fibers, or a combination thereof.

In yet another embodiment, the metal fibers and glass fibers melt at a temperature of greater than 800° C.

In yet another embodiment, the carbon fibers are removed via oxidation.

In yet another embodiment, the disposing in the ceramic matrix composite the sacrificial yarn comprises weaving the sacrificial yarn into the ceramic matrix in a periodic fashion.

In yet another embodiment, the disposing of the sacrificial yarn in the ceramic matrix composite comprises weaving the sacrificial yarn into the ceramic matrix in an aperiodic fashion.

In yet another embodiment, the elevated temperature is greater than 800° C.

In yet another embodiment, the wherein the glass fiber comprises E-glass, A-glass, C-glass, D-glass, R-glass, S-glass or a derivative of one of the foregoing glasses.

In yet another embodiment, the sacrificial fiber has a diameter of 30 to 1600 micrometers.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
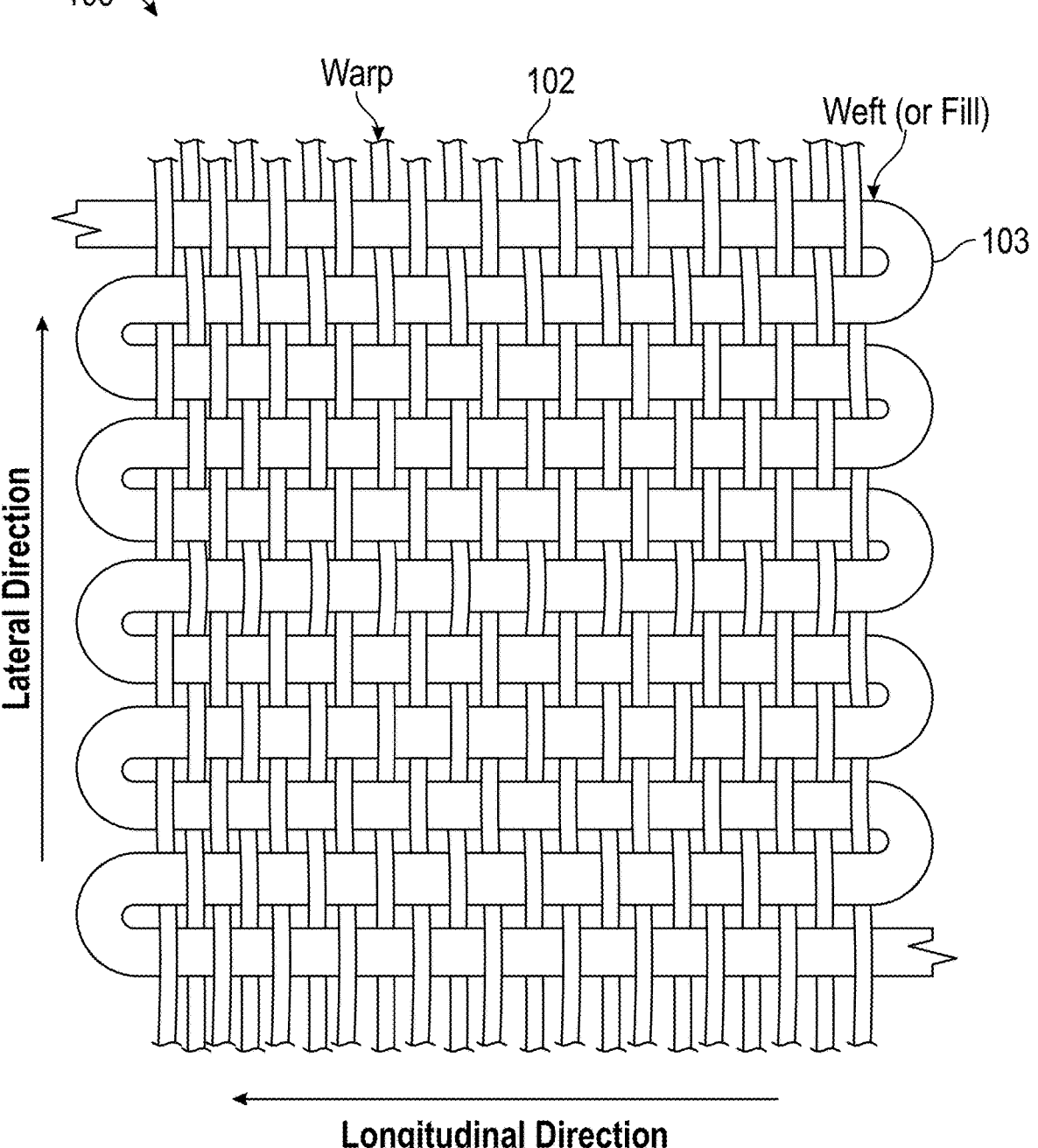
FIG. 1 is a top view of the woven ply.

A detailed description of one or more embodiments of the disclosed apparatus and method are presented herein by way of exemplification and not limitation with reference to the Figures.

Disclosed herein is a ceramic composite matrix that comprises preforms made up of plies, comprising weft and fill fibers, with sacrificial fibers woven into the preform. The sacrificial fibers undergo degradation either prior to or during a densification process producing spaces between the ceramic fibers in the preform. These open spaces permit the flow of air through the ceramic matrix composite, decreasing the fracturing that may result from stress and further preventing overheating. Improved air flow prevents the formation of cracks in the ceramic matrix composite and facilitates improved cooling. In addition, once the cooling holes are formed from degradation during the densification process, this improves densification in and around the holes. The densification as disclosed herein refers to a precursor reaction that occurs in a ceramic matrix composite when the precursors (in vapor or liquid form) react to form the ceramic matrix. This reaction occurs in CVI, PIP, MI, and other processes used to form the ceramic matrix composite.

The ceramic matrix composite is the resulting ceramic matrix structure, after the infiltration of the matrix material is complete. A preform comprises a plurality of plies that are made by weaving together fibers. A ply comprises fibers, which can be woven unidirectionally or in different patterns. The plies are stacked on top of each other and infiltrated with the matrix material. The sacrificial fibers are woven into the preform, co-mingling into the ply. The sacrificial fibers are woven into the plies, the space between the plies, and can be looped on the sides of the preform. The sacrificial fibers undergo degradation or melting during the chemical vapor infiltration process.

Incorporating sacrificial fibers enables further control over cooling holes in the preform. In one form a sacrificial fiber may be a single fiber or may be a tow that comprises a plurality of fibers. The sacrificial fiber will be made up of a material that thermally decomposes upon exposure to temperatures greater than the temperature at which densification takes place. In an embodiment, the sacrificial fibers comprise carbon fibers that oxidize at temperatures greater than the temperature at which precursor densification takes place. In another embodiment, the sacrificial fibers is a glass that melts at a higher temperature than the temperature at which precursor densification takes place. In yet another embodiment, the sacrificial fiber is a metal fiber that melts at a higher temperature than the temperature at which precursor densification takes place.

During the precursor densification process, the preform is subject to a high temperature causing the fibers to oxidize (and decompose) or melt. After the degradation and evaporation of the sacrificial fiber occurs, a hole is left behind where the sacrificial fiber previously was. This hole serves as a cooling hole through which cool gases can pass.

As depicted in FIG. 1, the woven ply 100 comprises a weaving pattern in which the warp fibers (102) and weft or fill fibers (103) alternate. The warp fiber is the set of elements stretched in place on a loom before the fill is introduced in the weaving process. In the embodiment depicted in FIG. 1, the warp fibers (102) run in the lateral direction. The warp and weft of fill fibers can be woven in a number of different patterns. This can include adjustments to allow for additional space in between the fibers. The fill fibers (103) are woven into the warp fibers (102) in the longitudinal direction. In the woven ply, the fibers are ceramic based and may be formed of silicon carbide (SiC). Other fibers can be used and will be described later.

Figure 2:
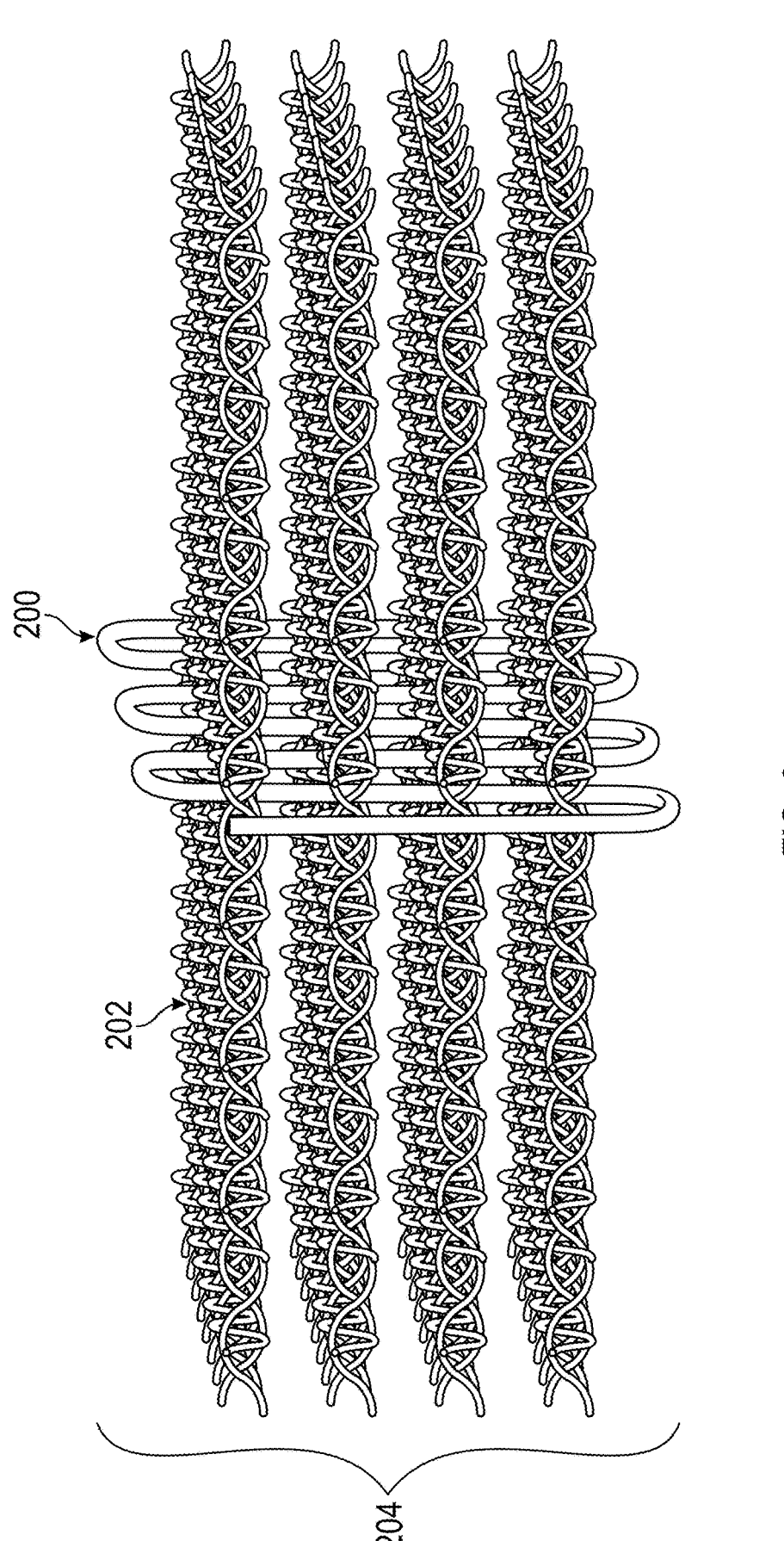
FIG. 2 is a side view of the woven preform, with the sacrificial fiber woven in between the woven plies.

The additional space allotted in the weaving pattern of the ply can allow for insertions of the sacrificial fibers. As depicted in FIG. 2, the sacrificial fibers (200) are woven in to the preform (204). The preform comprises plies (202), which are stacked on top of each other to allow for proliferation of the ceramic material. In FIG. 2, four plies (202) are depicted stacked one on top of the other with a sacrificial fiber (200) woven into the plies (202). The sacrificial fiber 200 is woven in and out of the plies 202 and the spacing between the points at which the sacrificial fiber 200 enters and exits the preform 204 may be periodic or aperiodic.

Figure 3:
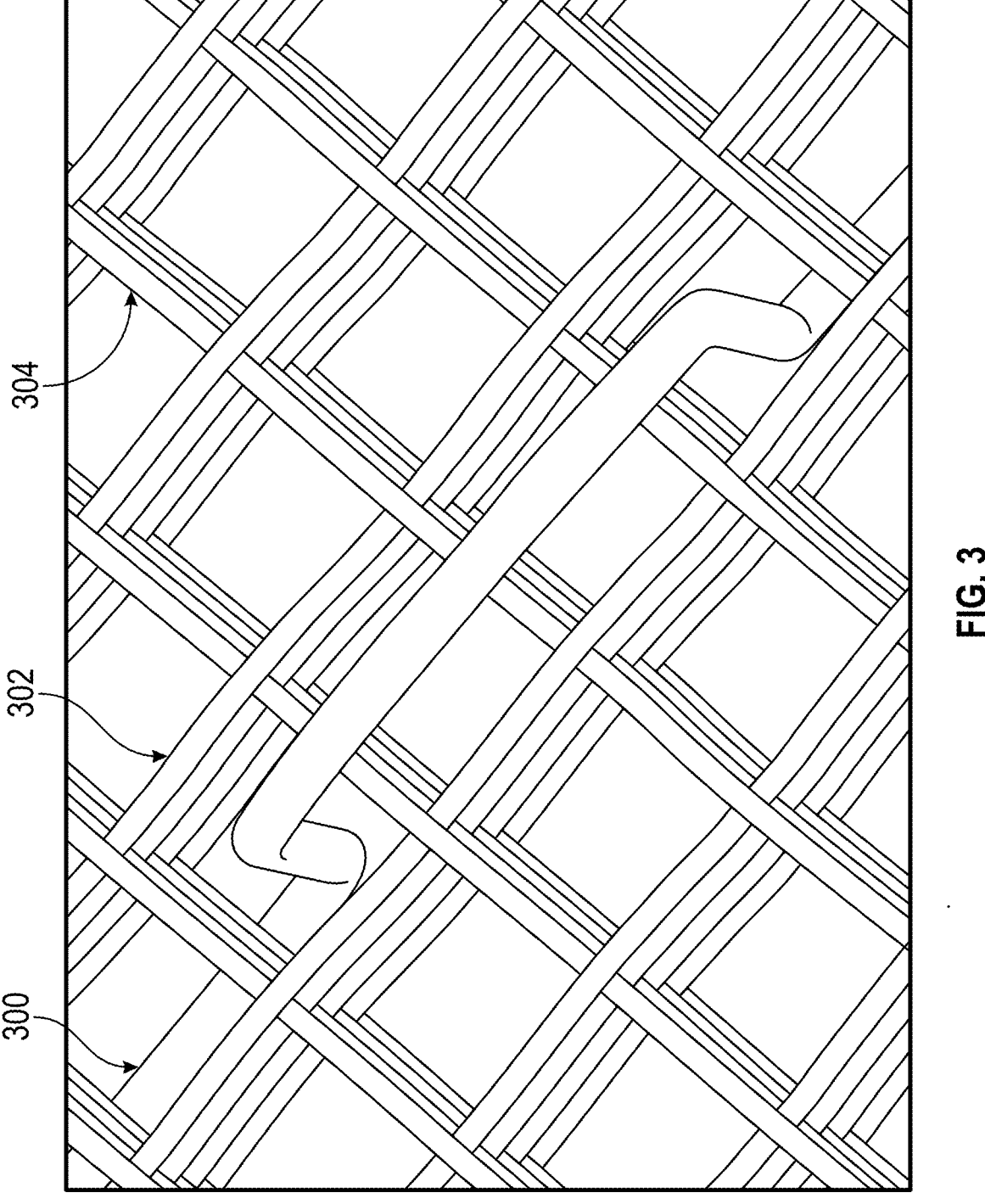
FIG. 3 is a top view of the woven preform in FIG. 2, the sacrificial fiber is woven into the plies.

FIG. 3 is a top view of the preform in FIG. 2. The sacrificial fiber (300), is woven in between the fibers that makeup the four stacked plies that form the preform. The warp fibers (302) and fill fibers (304) are woven together to form a ply. The sacrificial fiber is woven in between the warp fibers (302) and fill fibers (304) and is looped over the sides of the preform. After degrading and evaporating under the high temperatures used in the densification process, the sacrificial fibers in the preform will leave behind a hole that serves as the cooling hole.

Figure 4:
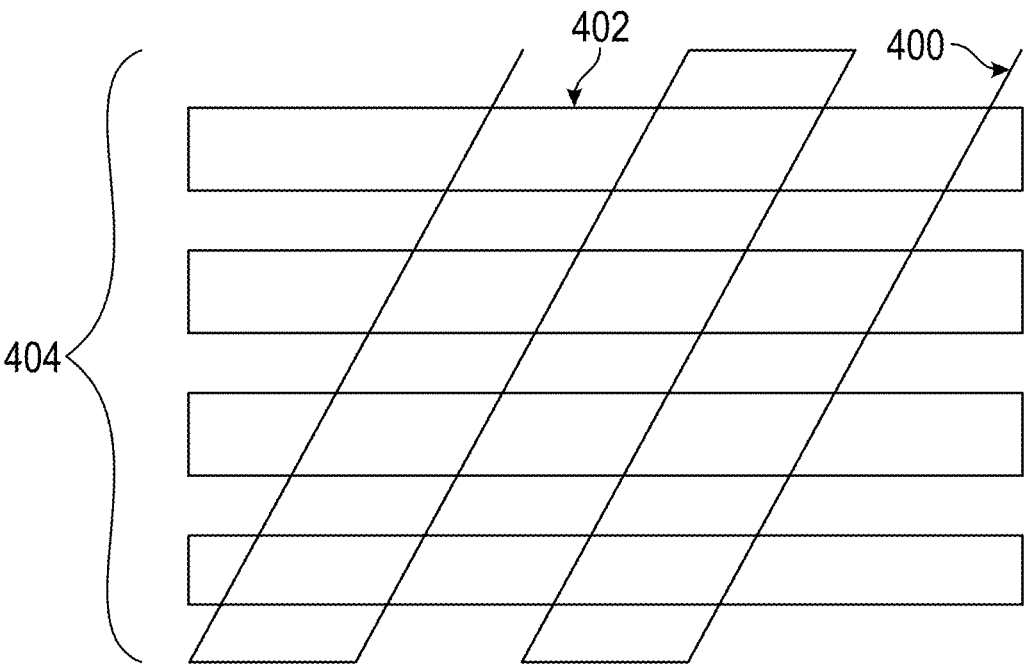
FIG. 4 is a side view of a woven preform, with the sacrificial fiber woven into the plies.
Figure 4:
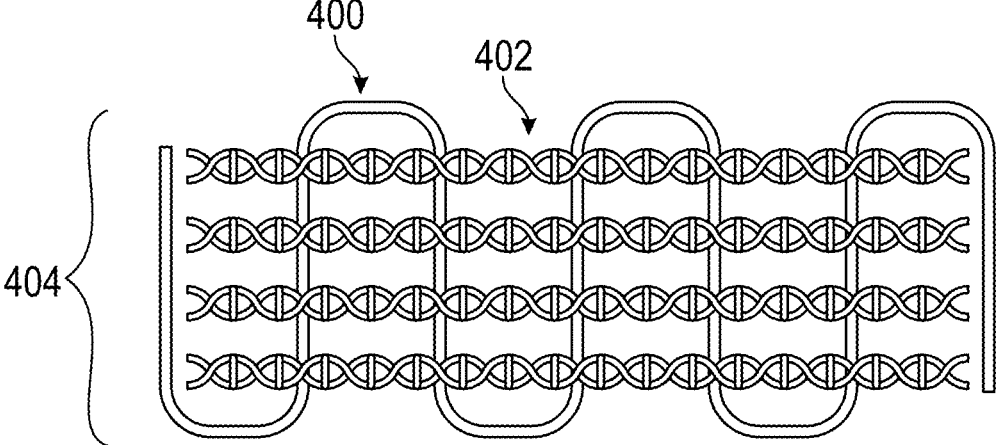

The sacrificial fiber can be woven into the plies in various different ways to enable further control over the cooling hole placement. In FIG. 4, the sacrificial fiber (400) is depicted as woven into the plies (402). The sacrificial fiber (400) is woven inside of the plies (402) and loops on the sides of the preform (404). After evaporating and degrading, this will leave behind just the holes inside of the plies (402) that makeup the preform (404).

The sacrificial fibers can be woven in various ways to enable control over the cooling hole placement in the preform. As depicted on the right side of FIG. 4, the cooling holes will be vertical in the preform (404). As depicted on the left side of FIG. 4, the sacrificial fiber (400) is woven diagonally into the plies (402), meaning after evaporation and degradation, the hole left by the sacrificial fiber would cut diagonally across the preform (404). The specific placement of the sacrificial fiber would create a different formation of cooling holes, which could be beneficial in creating specified cooling airflows. The formation of the cooling holes typically occurs after densification has taken place and typically occurs at temperatures greater than the densification temperature.

As noted above, the sacrificial fibers may be carbon fibers, glass fibers or metal fibers that will withstand temperatures used in the densification process. The sacrificial fibers have diameters of 30 to 1600 micrometers, preferably 100 to 1000 micrometers. The sacrificial fibers are preferably those that do not leave any char behind upon decomposing, oxidizing or melting. In an embodiment, carbon fibers may be used as sacrificial fibers. Carbon fibers may undergo oxidation at temperatures of 800° C. or greater. Upon undergoing oxidation, the carbon fibers decompose to leave behind holes that can serve as cooling holes. An oxidizing atmosphere may be used to facilitate oxidation of the carbon fibers. Catalysts that facilitate oxidation may also be used.

Glass fibers having melting temperatures of 800° C. or greater may be used as sacrificial fibers. Useful glass fibers can be formed from any type of fiberizable glass composition known to those skilled in the art and include those prepared from fiberizable glass compositions commonly known as "E-glass," "A-glass," "C-glass," "D-glass," "R-glass," "S-glass," as well as derivatives of the foregoing glasses.

Metals that can be used as sacrificial fibers are those that melt at temperatures greater than 800° C. Suitable metals include stainless steel, titanium, tungsten, tantalum, nickel, or a combination thereof. It is desirable for the sacrificial fibers to be inert towards the matrix material.

Suitable ceramic fibers comprise silicon carbide (SiC), alumina ($Al_2O_3$), mullite ($Al_2O_3$—$SiO_2$), or a combination thereof. In an embodiment, ply may contain non-ceramic fibers. Suitable non-ceramic fibers are carbon fibers. The ceramic matrix (that fills in the space between the fibers) comprises SiC, $Al_2O_3$, BN, $B_4C$, $Si_3N_4$, $MoSi_2$, $SiO_2$, SiOC, SiNC, and/or SiONC.

In one method of manufacturing a preform (that initially comprises a sacrificial fibers), a plurality of fibers are woven into the ply. A stack of plies may be combined to form a preform. The sacrificial fiber is then woven into the resulting plies. The weaving method may use various braiding techniques or involve twisting the composite fibers. In another method, the preform may be manufactured by weaving the ceramic fibers with the sacrificial fibers. The sacrificial fibers may also be woven into the plies, as they are stacked to form the preform. The sacrificial fibers may be looped, such that portions are exposed on the sides of the preform.

The sacrificial fibers may be present in the preform in an amount of greater than or equal to 20 wt %, preferably greater than or equal to 30 wt % and more preferably greater than or equal to 40 wt %, based on the total weight of the composite fiber prior to densification.

The preform with the sacrificial fibers disposed therein is then subjected to densification process via processes such as CVI, PIP, MI, and the like. After densification has occurred, the ceramic matrix composite with the sacrificial fibers disposed therein is subjected to a high temperature process to remove the sacrificial fiber from the composite. The temperature at which the sacrificial fiber is removed greater than 800° C., preferably greater than 1000° C., and more preferably greater than 1200° C. The removal of the sacrificial yarn may be conducted in an oxidizing atmosphere such as oxygen, water, and the like. Gases that decompose to produce oxygen such as carbon dioxide, carbon monoxide may also be used. Catalysts that facilitate the decomposition of oxygen containing gases to produce oxygen may also be present during the removal of the sacrificial fibers.

After the removal of the sacrificial fibers, the cooling holes produced in the ceramic matrix composite may be subjected to finishing operations such as lapping, grinding to remove any sharp edges, burrs, and the like. The finishing operations should preferably not produce any cracks or additional stress concentrators.

The ceramic matrix composites with the cooling holes formed in this manner may be used in a variety of articles such as turbine blades, blade outer seal (BOAS), and the like.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A composite comprising:
a ceramic matrix composite comprising a preform including a plurality of woven plies stacked on top of each other in a vertical direction, each woven ply including ceramic fibers in the form of warp fibers extending in a longitudinal direction and fill fibers woven into the warp fibers and extending in a lateral direction; and
one or more sacrificial fibers woven into the preform; where the sacrificial fibers are woven vertically through the plies between warp fibers and fill fibers of each ply and are looped over the sides of the preform; and where portions of the sacrificial fibers are exposed on the sides of the preform; where the sacrificial fibers are operative to undergo oxidation or melting upon being subjected to an elevated temperature; and wherein the sacrificial fibers leave cooling holes in the composite preform upon being subjected to oxidation or melting; wherein the sacrificial fibers comprise glass fibers.

2. The composite of claim 1, wherein the ceramic fibers comprise SiC, $Al_2O_3$, BN, $B_4C$, $Si_3N_4$, $MoSi_2$, $SiO_2$, SiOC, SiNC, and/or SiONC.

3. The composite of claim 1, wherein the sacrificial fibers have melting points at temperatures of greater than 800° C.

4. The composite of claim 1, wherein the sacrificial fiber is present in the ceramic matrix composite in an amount of greater than or equal to 20 wt %, based on a total weight of the ceramic matrix composite.

5. The composite of claim 1, wherein the sacrificial fiber is woven into the ceramic matrix composite in a periodic fashion.

6. The composite of claim 1, wherein the sacrificial fiber is woven into the preform in an aperiodic fashion.

7. The composite of claim 1, wherein the sacrificial fiber has a diameter of 30 to 1600 micrometers.

8. The composite of claim 1, wherein the sacrificial fiber further comprises a metal fiber, wherein the metal fiber comprises stainless steel, titanium, tantalum, tungsten, nickel, or a combination thereof.

9. The composite of claim 1, wherein the glass fiber comprises E-glass, A-glass, C-glass, D-glass, R-glass, or S-glass.

* * * * *